US008886144B2

(12) United States Patent
Yin et al.

(10) Patent No.: US 8,886,144 B2
(45) Date of Patent: Nov. 11, 2014

(54) COMPENSATION APPARATUS FOR RECEIVER ASYMMETRIC WIDE PASSBAND FREQUENCY RESPONSE WITH 25% DUTY CYCLE PASSIVE MIXER

(71) Applicant: Futurewei Technologies, Inc., Plano, TX (US)

(72) Inventors: Ping Yin, Greensboro, NC (US); Seong-Mo Yim, Oak Ridge, NC (US); Feng Wang, Jamestown, NC (US); Robert Grant Irvine, Greensboro, NC (US); Chengfang Liao, Shanghai (CN); Yusong Chi, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 172 days.

(21) Appl. No.: 13/667,983

(22) Filed: Nov. 2, 2012

(65) Prior Publication Data
US 2013/0115894 A1    May 9, 2013

Related U.S. Application Data

(60) Provisional application No. 61/555,282, filed on Nov. 3, 2011.

(51) Int. Cl.
*H04B 1/18*    (2006.01)
*H04B 1/12*    (2006.01)
*H04B 1/52*    (2006.01)

(52) U.S. Cl.
CPC ............... *H04B 1/123* (2013.01); *H04B 1/525* (2013.01)
USPC ..................... 455/189.1; 455/191.1; 455/147; 342/100

(58) Field of Classification Search
USPC ........... 455/189.1, 191.1, 147, 209, 208, 258, 455/317; 342/100, 357.12
See application file for complete search history.

(56) References Cited

U.S. PATENT DOCUMENTS

| 3,701,949 | A  | * | 10/1972 | Turkish ........................ 455/147 |
| 3,839,678 | A  | * | 10/1974 | Bell ............................. 455/180.3 |
| 4,445,118 | A  | * | 4/1984  | Taylor et al. ............. 342/357.395 |
| 4,498,191 | A  | * | 2/1985  | Rogers ....................... 455/164.2 |
| 4,554,120 | A  | * | 11/1985 | Ramamurthy .................. 264/85 |
| 6,751,272 | B1 | * | 6/2004  | Burns et al. ................... 375/340 |
| 6,957,056 | B2 | * | 10/2005 | Fitzrandolph ................. 455/323 |
| 7,505,086 | B2 | * | 3/2009  | Yun et al. ..................... 348/725 |

(Continued)

OTHER PUBLICATIONS

Foreign Communication From a Counterpart Application, PCT Application No. PCT/US2012/063405, International Search Report dated Mar. 25, 2013, 4 pages.

(Continued)

*Primary Examiner* — Minh D Dao
(74) *Attorney, Agent, or Firm* — Conley Rose, P.C.; Grant Rodolph; William H. Dietrich

(57) ABSTRACT

A receiver compensation method comprising receiving a radio frequency signal, amplifying the radio frequency signal, thereby producing an amplified signal, compensating the amplified signal, thereby producing a compensated signal, and mixing the compensated signal, thereby producing a mixed compensated signal, wherein the mixed compensated signal has a first gain difference between a positive differential from a center frequency and a negative differential from the center frequency and wherein the first gain differential is smaller than a second gain differential that would be obtained by mixing the amplified signal without compensating the amplified signal.

11 Claims, 5 Drawing Sheets

(56) References Cited

U.S. PATENT DOCUMENTS

| | | | |
|---|---|---|---|
| 8,744,385 B2* | 6/2014 | Yahav et al. | 455/147 |
| 2003/0186668 A1* | 10/2003 | Fitzrandolph | 455/313 |
| 2005/0249307 A1* | 11/2005 | Yu et al. | 375/272 |
| 2008/0139149 A1 | 6/2008 | Mu et al. | |
| 2009/0258615 A1 | 10/2009 | Capofreddi et al. | |
| 2010/0035563 A1 | 2/2010 | Mikhemar et al. | |
| 2010/0041361 A1 | 2/2010 | Ojo | |
| 2011/0053547 A1* | 3/2011 | Yahav et al. | 455/317 |
| 2013/0157584 A1* | 6/2013 | Tekin et al. | 455/73 |
| 2014/0079157 A1* | 3/2014 | Simmonds | 375/316 |
| 2014/0155014 A1* | 6/2014 | Leung et al. | 455/318 |

OTHER PUBLICATIONS

Foreign Communication From a Counterpart Application, PCT Application No. PCT/US2012/063405, Written Opinion dated Mar. 25, 2013, 7 pages.

Cook, et al., "Low-Power 2.4-GHz Transceiver with Passive RX Front-End and 400-mV Supply," IEEE Journal of Solid-State Circuits, vol. 41, No. 12, Dec. 2006, pp. 2757-2766.

* cited by examiner

COMPENSATION APPARATUS FOR RECEIVER ASYMMETRIC WIDE PASSBAND FREQUENCY RESPONSE WITH 25% DUTY CYCLE PASSIVE MIXER

CROSS-REFERENCE TO RELATED APPLICATIONS

The present application claims benefit of U.S. Provisional Patent Application No. 61/555,282 filed Nov. 3, 2011 by Ping Yin, et al. and entitled "Compensation Apparatus for Receiver Asymmetric Wide Pass-band Frequency Response with 25% Duty Cycle Passive Mixer," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A mobile device may be generally configured to communicate with a wireless network and may generally comprise a transceiver (e.g., a receiver and a transmitter), a local oscillator (LO), and a mixer. In a radio receiver where a passive mixer coupled with a 25% duty cycle LO implements a translational filter to suppress a transmit signal leakage, the resulting frequency response (e.g., band-pass characteristic) may be asymmetric with respect to the gain at a positive frequency offset and a negative frequency offset from the carrier frequency. In an asymmetric frequency response, the gain difference between the positive frequency offset and the negative frequency offset is an increasing function of the frequency offsets and yields a greater impact at higher signal bandwidths. In a 3G cellular system standard (also known as Universal Mobile Telecommunications System (UMTS) or Wideband Code Division Multiple Access (WCDMA)), the signal bandwidth is not sufficiently large for the asymmetry to be significant. However, in a 4G cellular system standard, the signal bandwidth is higher and a gain imbalance between the positive frequency offset and negative frequency offset of the signal bandwidth may cause significant performance degradation.

For a digitally modulated signal, an asymmetry in the frequency response of the receiver will degrade the modulation accuracy at its output and, thereby, increase the error rate of the communication system. In conventional cellular terminals that transmit and receive simultaneously, a duplexer may be employed to suppress a leakage of a transmit signal into the received signal path. Additionally, further suppression may be required to avoid excessive desensitization of the receiver by the leakage of the transmit signal. However, conventional devices, systems, and methods are insufficient to generate a sufficient symmetric frequency response about a carrier frequency. As such, devices, systems, and methods allowing for the generation of such frequency responses are needed.

SUMMARY

Disclosed herein is a receiver compensation method comprising receiving a radio frequency signal, amplifying the radio frequency signal, thereby producing an amplified signal, compensating the amplified signal, thereby producing a compensated signal, and mixing the compensated signal, thereby producing a mixed compensated signal, wherein the mixed compensated has a first gain difference between a positive differential from a center frequency and a negative differential from the center frequency and wherein the first gain differential is smaller than a second gain differential that would be obtained by mixing the amplified signal without compensating the amplified signal.

Also disclosed herein is a mobile device comprising an antenna, a duplexer coupled to the antenna, a low noise amplifier coupled to the duplexer, a compensator comprising a balun coupled to the low noise amplifier, a mixer coupled to the compensator, a filter coupled to the mixer, an amplifier coupled to the filter, an analog to digital converter coupled to the amplifier, a logic unit coupled to the analog to digital converter, and a screen coupled to the logic unit.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION OF THE EMBODIMENTS

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of an asymmetric frequency response compensator (AFRC), a mobile device comprising an AFRC, and methods using the same. In an embodiment, an AFRC may be employed to compensate an asymmetrical frequency response at the output of a mixer, as will be disclosed herein. For example, the AFRC may be employed to correct and/or to compensate an asymmetrical frequency response at the output of a passive mixer coupled to a local oscillator, thereby improving modulation accuracy, lowering the bit error rate, and/or increasing the throughput of the receiver and/or a mobile device.

Figure 1:
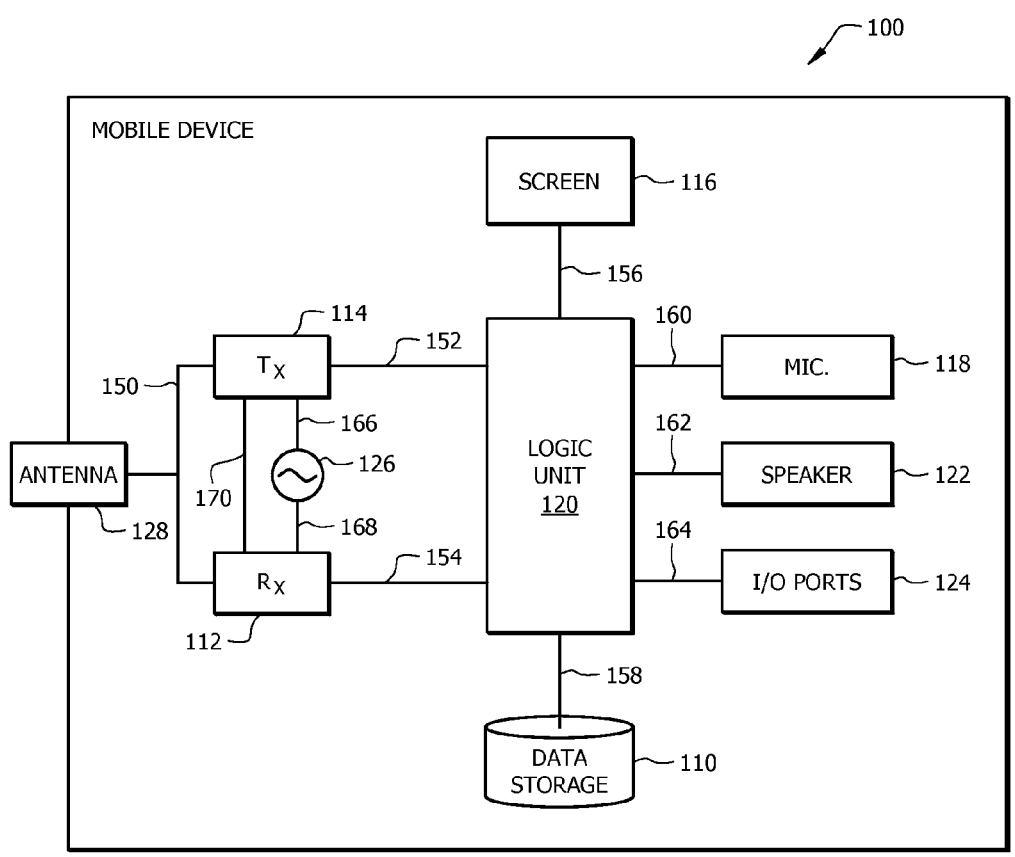
FIG. 1 is a schematic diagram of an embodiment of a mobile device.

Referring to FIG. 1, an embodiment of an operating environment of an AFRC is illustrated. In an embodiment, the operating environment generally comprises a plurality of functional units associated with a mobile device, as will be disclosed herein.

In the embodiment illustrated in FIGS. 1, 2, 3, and 4, the mobile device 100 may comprise a plurality of functional units. In an embodiment, a functional unit (e.g., an integrated circuit (IC)) may perform a single function, for example, serving as an amplifier or a buffer. Additionally or alternatively, in an embodiment, the functional unit may perform multiple functions on a single chip. In an embodiment, the functional unit may comprise a group of components (e.g., transistors, resistors, capacitors, diodes, and/or inductors) on an IC which may perform a defined function. The functional unit may comprise a specific set of inputs, a specific set of outputs, and an interface (e.g., an electrical interface, a logic interface, and/or other interfaces) with other functional units of the IC and/or with external components. In some embodiments, the functional unit may comprise repeat instances of a single function (e.g., multiple flip-flops or adders on a single chip) or may comprise two or more different types of functional units which may together provide the functional unit with its overall functionality. For example, a microprocessor may comprise functional units such as an arithmetic logic unit (ALU), one or more floating-point units (FPU), one or more load or store units, one or more branch prediction units, one or more memory controllers, and other such modules. In some embodiments, the functional unit may be further subdivided into component functional units. For example, a microprocessor as a whole may be viewed as a functional unit of an IC, for example, if the microprocessor shares a circuit with at least one other functional unit (e.g., a cache memory unit).

The functional unit may comprise, for example, a general purpose processor, a mathematical processor, a state machine, a digital signal processor, a video processor, an audio processor, a logic unit, a logic element, a multiplexer, a demultiplexer, a switching unit, a switching element an input/output (I/O) element, a peripheral controller, a bus, a bus controller, a register, a combinatorial logic element, a storage unit, a programmable logic device, a memory unit, a neural network, a sensing circuit, a control circuit, a digital to analog converter, an oscillator, a memory, a filter, an amplifier, a mixer, a modulator, a demodulator, and/or any other suitable devices as would be appreciated by one of ordinary skill in the art.

In the embodiments of FIGS. 1, 2, 3, and 4, the mobile device 100 may comprise a plurality of distributed components and/or functional units and each functional unit may communicate with via a suitable signal conduit, for example, via one or more electrical connections, as will be disclosed herein.

In the embodiment of FIG. 1, the operating environment comprises mobile device 100 comprising a plurality of interconnected functional units, for example, for transmitting and/or receiving one or more wireless signals. In the embodiment of FIG. 1, the mobile device 100 may generally comprise various functional units including, but not limited to one or more antennas 128, a transmitter 114, a receiver 112, a local oscillator 126, a logic unit 120, a data storage device 110, a screen 116, a microphone 118, a speaker 122, and a plurality of input and/or output (I/O) ports 124, arranged as shown in FIG. 1. In such an embodiment, the mobile device 100 is configured such that a wireless signal may be received, transmitted, and/or undergo signal processing by the mobile device 100. While FIG. 1 illustrates a particular embodiment of an operating environment in which an AFRC may be employed and/or a particular configuration of functional units with which an AFRC may be associated, one of ordinary skill in the art, upon viewing this disclosure, will appreciate that an AFRC as will be disclosed herein may be similarly employed in alternative operating environments and/or with alternative configurations of mobile device functional units.

In an embodiment, the mobile device 100 may comprise one or more antennas 128, which may be exterior to and/or interior to the mobile device 100. In such an embodiment, the antennas 128 may be configured to receive and/or to transmit a wireless signal to/from the mobile device 100. In an embodiment, the antenna 128 may comprise a patch antenna, a microstrip antenna, a loop antenna, an omnidirectional antenna, a planar inverted-F antenna (PIFA), a folded inverted conformal antenna (FICA), a mono pole antenna, any other suitable antenna as would be appreciated by one of ordinary skill in the art upon viewing this disclosure, or combinations thereof. Additionally, in an embodiment, the antennas 128 may be configured to be responsive to one or more predetermined frequency bands. For example, the antennas 128 may be configured to be responsive to a wireless signal (e.g., a radio frequency (RF) signal) within a predetermined frequency band, for example, within the 700 Band, the 800 band, the 850 band, the 1400 band, the personal communications service (PCS) band, the advanced wireless services (AWS) band, the broadband radio service (BRS)/emergency broadcast system (EBS) band, the long term evolution (LTE) band, any other suitable frequency band as would be appreciated by one of ordinary skill in the art upon viewing this disclosure, or combinations thereof. In an additional or alternative embodiment, the antennas 128 may be configured to be selectively tuned to be responsive to one or more frequency bands, for example, by an antenna switch, as will be disclosed herein.

In an embodiment, the antennas 128 may be configured to interface and/or to couple to the transmitter 114, the receiver 112, and/or any other functional units of the mobile device 100, as will be disclosed herein. For example, in the embodiment of FIG. 1, the output of the antennas 128 may be electrically connected to an input of the transmitter 114 (e.g., via electrical connection 150) and/or to an input of the receiver 112 (e.g., via electrical connection 150).

In an embodiment, the logic unit 120 comprises an electronic circuit configured to perform arithmetic operations and/or logical operations. Additionally, in an embodiment, the logic unit 120 may be configured to control the flow of data through the mobile device 100 and/or coordinate the activities of one or more functional units of the mobile device 100. For example, the logic unit 120 may be configured to be coupled with and/or to control data transmission between the transmitter 114, the receiver 112, the microphone 118, the speaker 122, and/or any other functional units of the mobile device 100. In an additional or alternative embodiment, the logic unit 120 may further comprise a digital signal processor (DSP) and may be configured to manipulate, to modify, and/or to improve a digital electrical signal, for example, a digital electrical signal from the receiver 112. In the embodiment of FIG. 1, the logic unit 120 may be electrically connected to the transmitter 114 (e.g., via electrical connection 152), the receiver 112 (e.g., via electrical connection 154), the screen 116 (e.g., via electrical connection 156), the microphone 118 (e.g., via electrical connection 160), the speaker 122 (e.g., via electrical connection 162), the data storage device 110 (e.g., via electrical connection 158), and the I/O ports 124 (e.g., via electrical connection 164).

In an embodiment, the data storage device 110 may be generally configured to store information (e.g., data) for the mobile device 100. In such an embodiment, the mobile device 100 may be configured to read and/or to write data to one or more memory cells of the data storage device 110. In an embodiment, the data storage device 110 may comprise a read only memory (ROM), a random access memory (RAM), a flash memory, an external memory (e.g., a secure digital (SD) card), any suitable type of memory device as would be appreciated by one of ordinary skill in the art upon viewing this disclosure, or combinations thereof.

In an embodiment, the screen 116 may be configured to present visual information to a mobile device user. For example, in such an embodiment, the screen 116 may comprise an liquid crystal display (LCD), a light emitting diode (LED) display, an organic light emitting diode (OLED) display, an active-matrix organic light emitting diode (AMOLED) display, a color super twisted nematic (CSTN) display, a thin film transistor (TFT) display, a thin film diode (TFD) display, and/or any other suitable type of display as would be appreciated by one of ordinary skill in the art upon viewing this disclosure. In an additional or alternative embodiment, the screen may further comprise a capacitive touchscreen or a resistive touchscreen.

In an embodiment, the microphone 118 and the speaker 122 may each be conventional as would be appreciated by one of ordinary skill in the art upon viewing this disclosure. For example, the microphone 118 may be configured to convert a voice signal to an electrical signal (e.g., an analog signal or a digital signal). Additionally, in an embodiment, the speaker 122 may be configured to convert an analog electrical signal into an audible signal.

In an embodiment, the plurality of I/O ports 124 may be generally configured to transmit electrical signals and/or data signals between the mobile device 100 and external hardware (e.g., an electrical outlet, a computer). For example, the I/O ports 124 may comprise a plurality of electrical contacts and may be mated with suitable interface as would be appreciated by one of ordinary skill in the art up on viewing this disclosure.

Additionally, in an embodiment, the mobile device 100 may further comprise one or more dedicated buttons and/or soft keys. For example, the one or more soft keys may be configured to allow a user to provide an input to the mobile device 100.

In an embodiment, the local oscillator 126 may be configured to produce a repetitive oscillating electronic signal (e.g., a sine wave or a square wave). For example, the local oscillator 126 may convert a direct current signal (e.g., from a power supply) to an alternating current signal. In an embodiment, the local oscillator 126 may be configured to produce an electronic signal oscillating at a frequency between 100 kilohertz (kHz) to 100 gigahertz (GHz). In the embodiment where the local oscillator 126 is configured to produce a square wave signal, the local oscillator 126 may also be configured to have a variable duty cycle. For example, the local oscillator 126 may be configured to produce a square wave signal with a 25% duty cycle. In an alternative embodiment, the local oscillator 126 may be configured to produce any other suitable signal as would be appreciated by one of ordinary skill in the art upon viewing this disclosure. The local oscillator 126 may be configured to interface and/or to couple to a mixer, for example, a mixer of the transmitter 114 (e.g., via electrical connection 166) and/or a mixer of the receiver 112 (e.g., via electrical connection 168), as will be disclosed herein.

In an embodiment, the transmitter 114 may comprise a plurality of interconnected functional units (e.g., an amplifier, a mixer, a filter, etc.) and may be configured to be coupled with one or more antennas 128 to produce an electrical signal and/or a RF signal. For example, the transmitter 114 may be configured to receive a data signal from the mobile device 100 and to transmit the data signal via a RF signal. In an embodiment, the transmitter 114 may be configured to produce and/or transmit a wireless signal (e.g., a RF signal) within the 700 Band, alternatively, the 800 band, alternatively, the 850 band, alternatively, the 1400 band, alternatively, the PCS band, alternatively, the AWS band, alternatively, the BRS/EBS band, alternatively, the LTE band, alternatively, any other suitable frequency band as would be appreciated by one of ordinary skill in the art upon viewing this disclosure. Additionally, in an embodiment, the transmitter 114 may comprise shared functional units and/or electrical connections to other functional units of the mobile device 100, for example, an electrical connection with the receiver 112 via the electrical connection 170.

In an embodiment, the receiver 112 may comprise a plurality of interconnect functional units (e.g., a low noise amplifier, a mixer, a filter, etc.) and may be configured to be coupled with one or more antennas 128 to receive an electrical signal and/or a RF signal, as will be disclosed herein. For example, the receiver 112 may be configured to receive an electrical signal (e.g., a voltage signal or a current signal) from the antenna 128 and may be configured to convert and/or to extract a data signal from the electrical signal, as will be disclosed herein.

Figure 2:
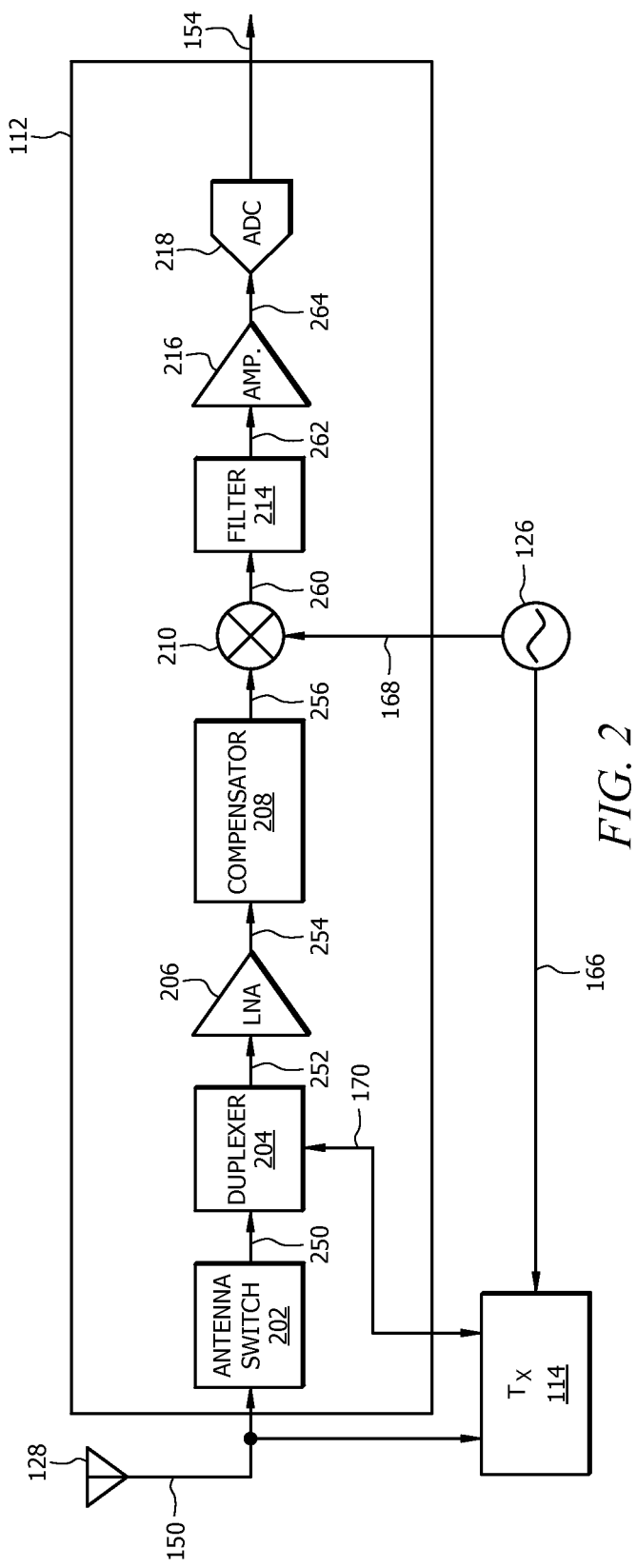
FIG. 2 is a schematic diagram of an embodiment of an electronic circuit implementation of a receiver.
Figure 4:
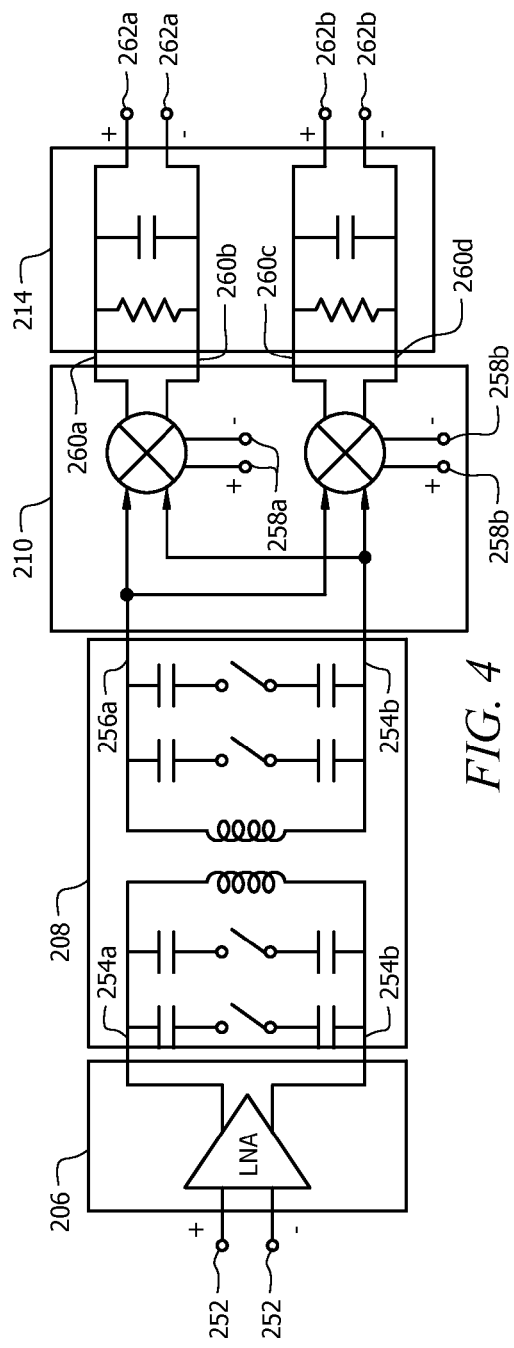
FIG. 4 is a schematic view of another embodiment of a partial electronic circuit implementation for a receiver.
Figure 5:
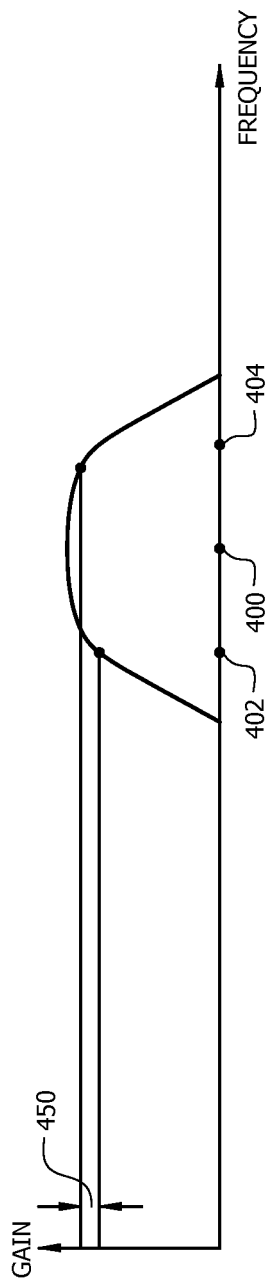
FIG. 5 is a chart of an uncompensated frequency response measured at the output of a mixer of a receiver.

In the embodiments of FIGS. 2, 4, and 5, an implementation of the receiver 112 is illustrated. It is noted that in such an embodiment the circuit level implementation is provided for illustrative purposes and that a person skilled in the relevant arts will recognize suitable alternative embodiments, configurations, and/or arrangements of such functional units which may be similarly employed. Any such functional unit embodiments may conceivably serve as elements of the disclosed implementation.

In the embodiment of FIG. 2, the receiver 112 may generally comprise an antenna switch 202, a duplexer 204, a low noise amplifier (LNA) 206, an AFRC 208, a mixer 210, a filter 214, an amplifier 216, and an analog to digital converter (ADC) 218. Although the embodiment of FIG. 2 illustrates a receiver 112 comprising multiple distributed components (e.g., an antenna switch 202, a duplexer 204, a LNA 206, an AFRC 208, a mixer 210, a filter 214, an amplifier 216, and an ADC 218, each of which comprises a separate, distinct component), in an alternative embodiment, a similar receiver 112 may comprise similar components in a single, unitary component; alternatively, the functions performed by these components (e.g., the antenna switch 202, the duplexer 204, the LNA 206, the AFRC 208, the mixer 210, the filter 214, the amplifier 216, and the ADC 218) may be distributed across any suitable number and/or configurations of like componentry, as will be appreciated by one of ordinary skill in the art with the aid of this disclosure.

In an embodiment, the antenna switch 202 may be configured to receive an electrical signal from the output of the antenna 128 (e.g., via electrical connection 150) and to output the electrical signal to the input of the duplexer 204 (e.g., via electrical connection 250). In an embodiment, the antenna switch 202 may be controllable and/or configured to selectively provide one or more electrical channels between the antenna 128 and the duplexer 204. For example, the antenna switch 202 may be controlled by the logic unit and may be configured to provide one or more electrical channels dependent on a frequency band of interest (e.g., the PCS band, the AWS band, the BRS band, etc.).

In an embodiment, the duplexer 204 may be configured to receive an electrical signal from the output of the antenna switch 202 (e.g., via electrical connection 250) and to output the electrical signal to the input of the LNA 206 (e.g., via electrical connection 252). In an additional or alternative embodiment, the duplexer 204 may further comprise an electrical connection to the transmitter 114 (e.g., via electrical connection 170). In an embodiment, the duplexer 204 may be configured to allow bi-directional electrical communication, for example, between the receiver 112 and the antenna 128 and/or the transmitter 114.

In an embodiment, the LNA 206 may be configured to receive an electrical signal from the output of the duplexer 204 and to output an amplified electrical signal to the input of the AFRC 208. In an embodiment, the LNA 206 may be configured to receive an electrical signal (e.g., a data signal received by the antenna 128) and to output an amplified electrical signal. For example, in the embodiment of FIG. 3 the LNA 206 comprises a differential input (e.g., an inverting input and a non-inverting input) and a differential output (e.g., an inverting output and a non-inverting output). Returning to FIG. 2, the LNA 206 may be configured to cause the electrical signal to experience a gain, for example, a voltage gain, and thereby proportionally increase the voltage level of the electrical voltage signal. Additionally or alternatively, in an embodiment, the LNA 206 may be further configured to convert a voltage signal to a current signal (e.g., a transconductance amplifier) or a current signal to a voltage signal (e.g., a transimpedance amplifier) before or after applying a gain to the electrical signal. Not intending to be bound by theory, applying a gain factor of greater than one to the electrical signal may increase the voltage range over which the analog voltage signal can vary or swing, thereby improving the resolution and/or detectability of small variations of the electrical signal. For example, the electrical signal may experience a gain by a factor of about 100, alternatively, by a factor of about 1,000, alternatively, by a factor of about 10,000, alternatively, by a factor of about 100,000, or any other suitable gain factor. For example, a voltage signal may experience a gain of about 1,000 and the voltage swing of the voltage signal may increase from about 1 millivolt (mV) to about 1 volt (V).

In an embodiment, the AFRC 208 may be configured to receive an amplified electrical signal from the LNA 206 (e.g., via electrical connections 254a-254b) and to output a compensated signal to the mixer 210 (e.g., via electrical connections 256a-256b). In an embodiment, the AFRC 208 may generally comprise a balun and one or more capacitors. In such an embodiment, the balun may be configured to convert between a balanced signal and an unbalanced signal, to provide electrical isolation, and/or be of a conventional type (e.g., a transformer) and/or configuration as would be appreciated by one of ordinary skill in the art upon viewing this disclosure. In the embodiment of FIGS. 4 and 5, the one or more capacitors may be electrically connected to an input side of the balun and/or an output side of the balun. In an embodiment, the capacitors may form a plurality of series and/or parallel connections with respect to one another (e.g., a capacitor array, or capacitor bank). In an additional or alternative embodiment, the one or more capacitors may comprise a variable capacitance and/or may be configured to have a controllable capacitance (e.g., configured in a switched capacitor configuration). For example, in the embodiment of FIG. 4, the one or more capacitors may be configured as switched capacitors and the overall capacitance of the capacitors may be varied by the opening and/or the closing of one or more switches (e.g., transistors). In such an embodiment, the capacitance of the capacitors may be controlled by another functional unit of the mobile device 100 (e.g., the logic unit 120). For example, the logic unit 120 may comprise a lookup table of predetermined capacitances and may be configured to modify the capacitance of the capacitors (e.g., opening and/or closing switches via controlling one or more transistors). In an additional or alternative embodiment, the capacitance of the AFRC 208 may be configured dependent on the frequency band (e.g., carrier frequency) of the RF signal. In an additional or alternative embodiment, the capacitance of the capacitors may be adjustable via a feedback circuit (e.g., a negative feedback circuit). In an additional or alternative embodiment, the capacitance of the capacitors may be established during manufacturing of the AFRC 208, the receiver 112, and/or the mobile device 100.

Figure 6:
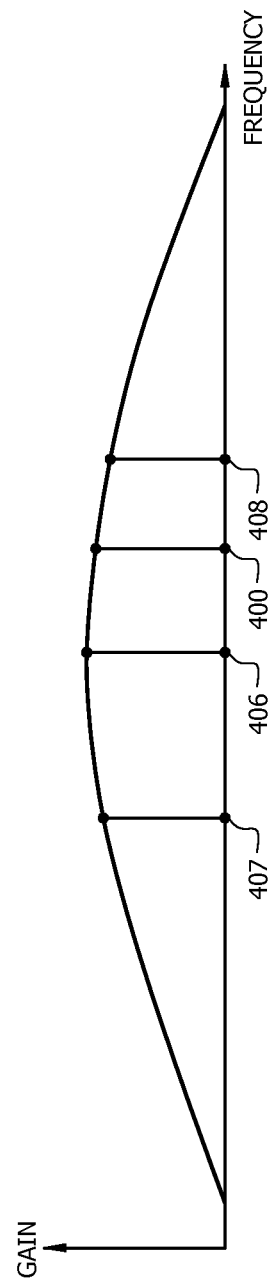
FIG. 6 is a chart of a frequency response of an output of an asymmetric frequency response compensator of a receiver.
Figure 7:
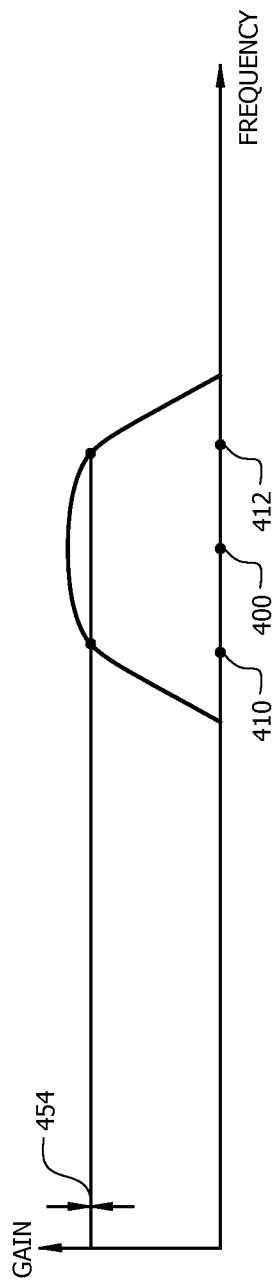
FIG. 7 is a chart of a compensated frequency response measured at the output of a mixer of a receiver.

In an embodiment, the AFRC 208 may be configured to have a bandpass frequency response comprising a center frequency 406, a negative offset frequency 407, and a positive offset frequency 408, as illustrated in FIG. 6. Additionally, in such an embodiment, the frequency response of the AFRC 208 may be adjustable by adjusting the capacitance of the one or more capacitors of the AFRC 208, as previously disclosed. For example, the AFRC 208 frequency response (e.g., the center frequency 406, the negative offset frequency 407, and/or the positive offset frequency 408) may be configured to adjust in response to the capacitance of the one or more capacitors of the AFRC 208, as will be disclosed herein. In an embodiment, the frequency response of the AFRC 208 may be configured to be adjusted (e.g., via adjusting the overall capacitance of the one or more capacitors of the AFRC 208) to compensate an asymmetrical frequency response of the mixer 210. For example, in an embodiment without the AFRC 208, the mixer 210 has an asymmetrical frequency response with respect to a center frequency 400. As illustrated in FIG. 5, the frequency response of the AFRC 208 may be shifted to a lower frequency range or a high frequency range for the purpose of compensating and/or correcting the asymmetrical frequency response of the mixer 210. For example, in the embodiment of FIG. 6, the center frequency 406 of the AFRC 208 frequency response may be set at a frequency below a center frequency 400 of the mixer 210 frequency response. In an alternative embodiment, the center frequency 406 of the AFRC 208 frequency response may be set at a frequency above the center frequency 400 of the mixer 210 frequency response. In such an embodiment, the combined series frequency response of the mixer 210 (e.g., as shown in FIG. 5) and the AFRC 208 (e.g., as shown in FIG. 6) will result in the compensated frequency response for the mixer 210, as illustrated in FIG. 7. In the embodiment of FIG. 7, the compensated frequency response of the mixer 210 has a symmetrical frequency response, for example, a gain differential 454 between a compensated low cut-off frequency 410 and a compensated high cut-off frequency 412 may be about zero.

It is noted that in an additional or alternative embodiment, an AFRC, for example, as similarly discussed with respect to the AFRC 208, may be similarly employed in the transmitter 114 of a mobile device 100.

Returning to FIGS. 2-4, the mixer 210 may be configured to receive the compensated signal from the AFRC 208 (e.g., via electrical connections 256a-256b) and to output a mixed compensated signal to the filter 214 (e.g., via electrical connections 260a-260d). Additionally, in an embodiment, the mixer 214 may be configured to receive an input signal from the local oscillator 126 (e.g., via electrical connections 258a-258b). For example, the mixer 210 may be coupled to a 25% duty cycle local oscillator and may be configured to receive a differential in-phase signal (e.g., via electrical connections 258a) and a quadrature signal (e.g., via electric connections 258b) from the local oscillator. In an embodiment, the mixer 210 may be a passive mixer and may generally comprise one or more diodes. In an alternative embodiment, the mixer 210 may be an active mixer and may generally comprise one or more diodes and/or one or more transistors. In an alternative embodiment, any suitable configuration may be employed as would be appreciated by one of ordinary skill in the art upon viewing this disclosure.

In an embodiment, the mixer 210 may be generally configured to generate a new frequency (e.g., carrier frequency) dependent on the carrier frequency of the input signal provided via the AFRC 208 and/or a signal from the local oscillator 126. For example, the mixer 210 may be configured to perform a frequency translation and may reduce the carrier frequency (e.g., down convert) of an input signal (e.g., the compensated signal). In an embodiment, the mixer 210 may be configured to have a bandpass frequency response comprising the center frequency 400, a negative offset frequency 402, and a positive offset frequency 404, as illustrated in FIG. 5. In the embodiment of FIG. 5, the mixer 210 bandpass frequency response may be asymmetrical. For example, the gain at the negative offset frequency 402 may be different from that gain at the positive offset frequency 404 and, thereby cause a mixer gain differential 450. Additionally, the frequency response of the mixer 210 may be influenced and/or compensated by the frequency response of the AFRC 208, as previously disclosed. For example, the overall frequency response and/or a compensated frequency response of the mixer 210 may be dependent on the combined series frequency response of the mixer 210 and the AFRC 208.

Figure 3:
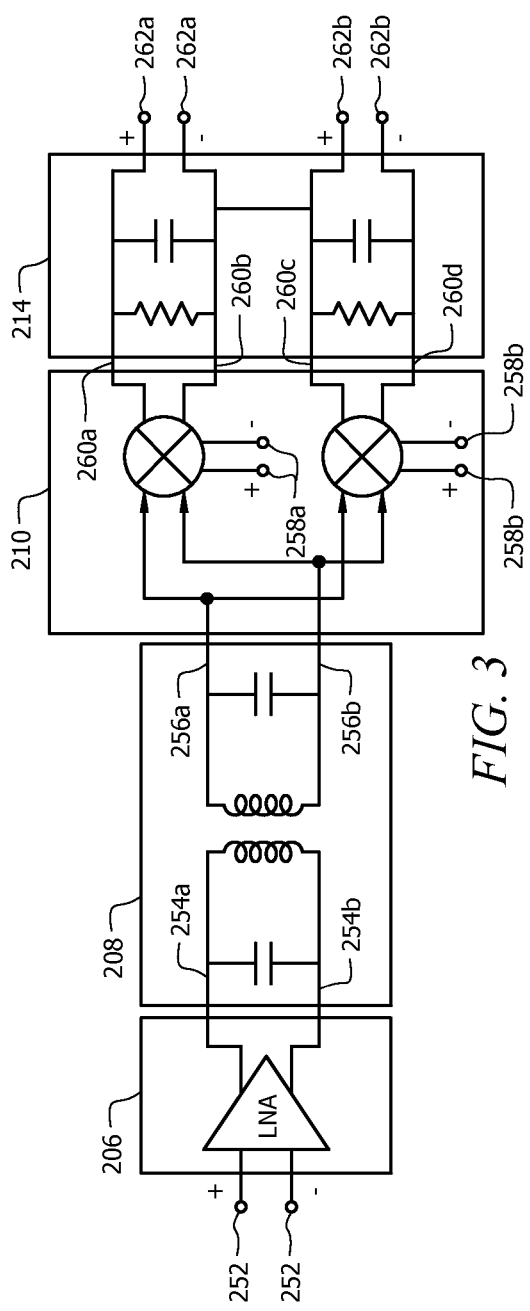
FIG. 3 is a schematic view of a partial electronic circuit implementation for a receiver.

In an embodiment, the filter 214 may be configured to receive a mixed compensated signal from the mixer 219 (e.g., via electrical connections 260a-260d) and to output a filtered electrical signal to the amplifier 216 (e.g., via electrical connections 262a-262b). In an embodiment, the filter 214 may be a passive filter and may comprise one or more passive electrical components (e.g., one or more capacitors, one or more resistors, one or more inductors, etc.). In an alternative embodiment, the filter 214 may be an active filter and may comprise one or more active electrical components (e.g., one or more transistors, one or more integrated circuits). For example, the filter 214 may be a passive filter and may comprise one or more capacitors and resistors, thereby forming an RC filter, as illustrated in FIGS. 3 and 4. In an alternative embodiment, any suitable configuration may be employed as would be appreciated by one of ordinary skill in the art upon viewing this disclosure.

In an embodiment, the filter 214 may be configured to filter frequencies above and/or below a predetermined cut-off frequency. For example, the filter 214 may be configured as a low-pass filter and may be configured to limit the bandwidth of the mixed compensated signal and/or to remove and/or substantially reduce the frequency content of the mixed compensated signal above a predetermined cut-off frequency, thereby generating the filtered electrical signal.

In an embodiment, the amplifier 216 may be configured to be to receive the filtered electrical signal from the output of the filter 214 (e.g., via electrical connections 262a-262b) and to output an amplified filtered electrical signal to the input of the ADC 218 (e.g., via electrical connections 264). In an embodiment, the amplifier 216 may comprise a differential input (e.g., an inverting input and a non-inverting input) and a differential output (e.g., an inverting output and a non-inverting output). In such an embodiment, the amplifier 216 may be configured to cause the filtered electrical signal to experience a gain, for example, a voltage gain, and thereby proportionally increase the voltage level of the electrical voltage signal. Additionally or alternatively, in an embodiment, the amplifier 216 may be further configured to convert a voltage signal to a current signal (e.g., a transconductance amplifier) or a current signal to a voltage signal (e.g., a transimpedance amplifier) before or after applying a gain to the electrical signal. Not intending to be bound by theory, applying a gain factor of greater than one to the electrical signal may increase the voltage range over which the analog voltage signal can vary or swing, thereby improving the resolution and/or detectability of small variations of the electrical signal, similar to previously disclosed. In an additional or alternative embodiment, the amplifier 216 may be configured to have a variable gain factor. For example, the gain factor of the amplifier 216 may be varied and/or controlled by other functional units of the mobile device 100 (e.g., the logic unit 120).

In an embodiment, the ADC 218 may be configured to receive the amplified filtered electrical signal from the amplifier 216 (e.g., via electrical connection 264) and to output a digital signal to one or more functional units of the mobile device 100 (e.g., via electrical connection 154). In an embodiment, the ADC 218 may be configured to convert an analog signal to a digital signal. For example, the ADC 218 may be configured to convert the amplified filtered electrical signal from an analog voltage signal to a digital voltage signal representative of the amplified filtered electrical signal. In an embodiment, the ADC 218 may comprise a suitable bit resolution and/or topology as would be appreciated by one of ordinary skill in the art upon viewing this disclosure. For example, the ADC 218 may comprise a 12-bit Sigma Delta ADC.

Figure 8:
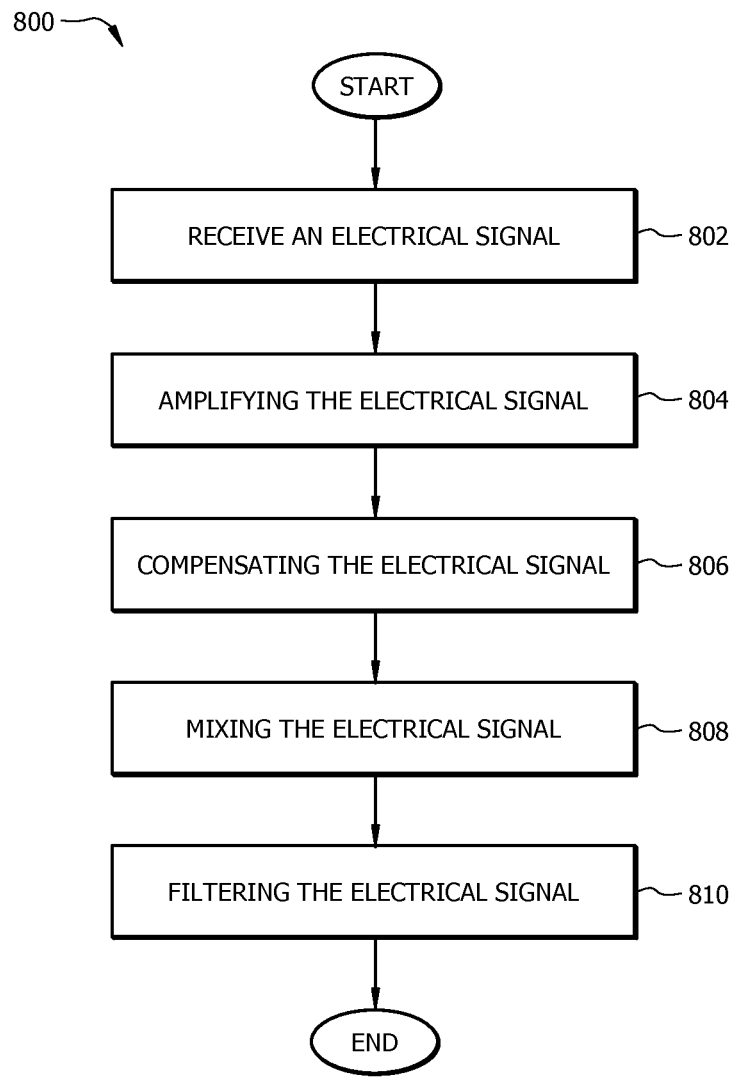
FIG. 8 is a flowchart of an embodiment of a receiver compensation method.

In an embodiment, a receiver compensation method utilizing the AFRC 208 and/or a system comprising an ARFC 208 is disclosed herein. In an embodiment, a receiver compensation method may generally comprise the steps of receiving a signal via one or more antennas 802 (e.g., the antennas 128), amplifying the signal 804, compensating the signal 806, mixing the signal 808, and filtering the signal 810, as illustrated in FIG. 8. In an additional embodiment, a receiver compensation method may further comprise applying a second amplification and converting the signal to a digital signal.

In an embodiment, where the receiver 112 is electrically connected to one or more antennas 128 of the mobile device 100, the antennas 128 and/or the antenna switch 202 may be set to be responsive to one or more predetermined frequency bands (e.g., the PCS band, the BRS/EBS band). Additionally, in such an embodiment, the antenna switch 202 and/or the duplexer 204 may be configured to provide one or more electrical channels between the antennas 128 and the receiver 112 (e.g., the LNA 206). In an embodiment, a RF signal (e.g., an electrical signal) may be received by the one or more antennas 128 and may be routed from the antennas 128 to the LNA 206, for example, via the antenna switch 202 and the duplexer 204. In such an embodiment, the electrical signal may comprise a data signal superimposed onto and/or transmitted via a carrier frequency signal.

In an embodiment, the electrical signal may pass through the LNA 206 and experience a gain (e.g., a voltage gain) and, thereby form an amplified electrical signal. For example, the electrical signal may experience a gain of about 1,000 and the voltage swing of the electrical signal may increase from about 1 mV to about 1 V.

In an embodiment, the capacitance of the AFRC 208 may be varied and/or the frequency response of the AFRC 208 may be adjusted to compensate the frequency of the mixer 210. For example, in the embodiment where the AFRC 208 comprises a switched capacitor configuration, one or more switches (e.g., transistors) may be controlled (e.g., via the logic unit 120) to increase or decrease the capacitance of the AFRC 208 to adjust the center frequency 406 and/or frequency response of the ARFC 208, for the purpose of compensating the frequency response of the mixer 210. Additionally, in such an embodiment, the amplified electrical signal may pass through the AFRC 208 and thereby generate a compensated electrical signal.

In the embodiment where the frequency response of the mixer 210 is compensated by the AFRC 208, the compensated electrical signal may pass through the mixer 210 and the carrier frequency of the compensated electrical signal may be down converted to a lower frequency (e.g., from a frequency of about 2.4 GHz to a about 100 KHz) and, thereby generate a mixed compensated electrical signal.

In an embodiment, the filter 214 may be configured as a low pass filter and configured to remove and/or substantially reduce the frequency content of the mixed compensated electrical signal above the predetermined cut-off frequency. In such an embodiment, the mixed compensated signal electrical signal may pass through the filter 214 and, thereby generate a filtered electrical signal.

In an additional or alternative embodiment, the filtered electrical signal may pass through the amplifier 216 and may be amplified by the gain of the amplifier 216, thereby generating an amplified filtered signal. For example, the filtered electrical signal may experience a gain by a factor of about two, alternatively, of about three, alternatively, of about five, alternatively, of about 10, alternatively, any suitable gain factor as would be appreciated by one of ordinary skill in the arts upon viewing this disclosure. In an additional or alternative embodiment, the amplified filtered signal may pass through the ADC 218 and may be converted into a digital signal (e.g., a digital representation of the amplified filtered signal). For example, the amplified filtered signal may be converted into a 12-bit digital representation of the amplified filtered signal. Further, in an embodiment, the digital signal may be further processed by one or more functional units of the mobile device 100.

In an embodiment, an AFRC 208, a system comprising an AFRC 208, and/or a receiver compensation method employing a system and/or an AFRC 208, as disclosed herein or in some portion thereof, may be advantageously employed during mobile device operations. As will be appreciated by one of ordinary skill in the art, conventional methods of employing a receiver comprising a mixer may not have the capabilities to provide and/or maintain a symmetrical frequency response for the mixer, in particular, in high bandwidth applications. In an embodiment, the AFRC 208 enables an asymmetric frequency response of a mixer 210 to be compensated by the AFRC 208 and to thereby provide a symmetrical frequency response for the mixer 210, as previously disclosed. For example, in such an embodiment, the performance of the receiver 112 and/or the mobile device 100 can be improved and provide a lower bit error rate and/or a higher throughput. Therefore, the methods disclosed herein provide a means by which the performance of the mixer 210, the receiver 112, and/or the mobile device and be improved.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus, comprising:
a low noise amplifier having an output;
a mixer having an input; and
a compensator coupled to the output of the low noise amplifier and to the input of the mixer, wherein the compensator comprises a balun and one or more capacitors,
wherein the capacitors are coupled to the balun on an input side, an output side, or both the input side and the output side of the balun, and wherein the compensator is configured to reduce an asymmetric frequency response with respect to a positive offset and a negative offset from a carrier frequency of a receiver as compared with an identical apparatus that lacks the compensator.

2. The apparatus of claim 1, wherein the compensator has a tunable frequency response via the capacitors.

3. The apparatus of claim 2, wherein the tunable frequency response is adjustable depending on a band of operation.

4. The apparatus of claim 3, further comprising a local oscillator with a duty cycle of about 25%, wherein the mixer is coupled to one or more outputs of the local oscillator.

5. The apparatus of claim 4, wherein the apparatus further comprises an antenna, an antenna switch coupled to the antenna, a duplexer coupled to the antenna switch and the low noise amplifier, a filter coupled to the mixer, an amplifier coupled to the filter, an analog to digital converter coupled to the filter, and a digital signal processor coupled to the analog to digital converter.

6. A method comprising:
receiving a radio frequency signal;
amplifying the radio frequency signal, thereby producing an amplified signal;
compensating the amplified signal, thereby producing a compensated signal; and
mixing the compensated signal, thereby producing a mixed compensated signal,
wherein the mixed compensated signal has a first gain differential between a positive differential from a center frequency and a negative differential from the center frequency, and
wherein the first gain differential gain is smaller than a second gain differential that would be obtained by mixing the amplified signal without compensating the amplified signal.

7. The method of claim 6, wherein the amplified signal is compensated by passing the amplified signal through a balun and a capacitor coupled to the balun.

8. The method of claim 7, wherein the amplified signal passes through the capacitor coupled to an input side of the balun and then through the balun.

9. The method of claim 7, wherein the amplified signal passes through the balun and then through the capacitor coupled to an output side of the balun.

10. The method of claim 7, wherein the amplified signal passes through a first capacitor coupled to an input side of the balun, then through the balun, and then through a second capacitor coupled to an output side of the balun.

11. The method of claim 7, wherein the first differential gain is about zero.

* * * * *

UNITED STATES PATENT AND TRADEMARK OFFICE
CERTIFICATE OF CORRECTION

PATENT NO. : 8,886,144 B2  
APPLICATION NO. : 13/667983  
DATED : November 11, 2014  
INVENTOR(S) : Ping Yin et al.

It is certified that error appears in the above-identified patent and that said Letters Patent is hereby corrected as shown below:

In the claims:

Column 13, Line 21 - Column 14, Line 10, Claim 6, should read as:
-- 6. A method comprising:
  receiving a radio frequency signal;
  amplifying the radio frequency signal, thereby producing an amplified signal;
  compensating the amplified signal, thereby producing a compensated signal; and
  mixing the compensated signal, thereby producing a mixed compensated signal,
  wherein the mixed compensated signal has a first gain differential between a positive differential from a center frequency and a negative differential from the center frequency, and
  wherein the first gain differential is smaller than a second gain differential that would be obtained by mixing the amplified signal without compensating the amplified signal. --

Column 14, Lines 24-25, Claim 11, should read as:
-- 11. The method of claim 7, wherein the first gain differential is about zero. --

Signed and Sealed this
Fourth Day of August, 2015

Michelle K. Lee
*Director of the United States Patent and Trademark Office*